United States Patent
Komatsu et al.

(10) Patent No.: US 6,643,079 B1
(45) Date of Patent: *Nov. 4, 2003

(54) METHOD AND APPARATUS FOR MAGNETIC TRANSFER

(75) Inventors: Kazunori Komatsu, Odawara (JP); Makoto Nagao, Odawara (JP); Masakazu Nishikawa, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,336

(22) Filed: Apr. 26, 2000

(30) Foreign Application Priority Data

Apr. 26, 1999 (JP) .......................................... 11-117807

(51) Int. Cl.$^7$ ................................................ G11B 5/86
(52) U.S. Cl. ....................... 360/17; 360/15; 360/360; 360/16
(58) Field of Search ...................................... 360/16, 17

(56) References Cited

U.S. PATENT DOCUMENTS

| | | | | |
|---|---|---|---|---|
| 4,110,797 A | * | 8/1978 | Hoshino et al. ........... 360/17 |
| 4,422,106 A | * | 12/1983 | Sawazaki ................. 360/17 |
| 5,032,931 A | * | 7/1991 | Suzuki et al. ............ 360/17 |
| 6,181,492 B1 | * | 1/2001 | Bonyhard ................. 360/17 |
| 6,347,016 B1 | * | 2/2002 | Ishida et al. ............ 360/135 |

FOREIGN PATENT DOCUMENTS

JP    360151843 A  *  8/1985  ............... 360/17

* cited by examiner

*Primary Examiner*—David Hudspeth
*Assistant Examiner*—Varsha A. Kapadia
(74) *Attorney, Agent, or Firm*—Sughrue Mion, PLLC (57) ABSTRACT

The present invention provides a method for magnetic transfer, said method comprising the steps of arranging permanent magnets each having magnetic field symmetrical to the axis of the magnetic pole at least on one of upper or lower surfaces of the slave medium with the axis of the magnetic pole disposed in parallel to the surface of the slave medium, rotating the slave medium or the permanent magnet in track direction, performing initial DC magnetization on the slave medium in advance in track direction, bringing the master carrier for magnetic transfer closely together with the slave medium processed by said initial DC magnetization, and performing magnetic transfer by applying magnetic field for transfer in track direction reverse to the direction of the initial DC magnetization on the surface of the slave medium.

12 Claims, 3 Drawing Sheets

METHOD AND APPARATUS FOR MAGNETIC TRANSFER

BACKGROUND OF THE INVENTION

The present invention relates to a method for recording a large amount of information on a magnetic recording medium at one time, and in particular, to a method for transferring a recording information to a magnetic recording medium of large capacity and high recording density.

With rapid development and progress in the utilization of digital image, amount of information to be handled in personal computers and other devices has extensively increased. Because of the increase of the amount of information, there are now strong demands on a magnetic recording medium, which has larger capacity to record the information and can be manufactured at low cost and requires shorter time for writing and reading operations.

In a high density recording medium such as hard disk or in a high density floppy disk type magnetic recording medium represented by ZIP (Iomega Inc.), information recording area has narrower track compared with the floppy disk now commonly used. In order that magnetic head can scan over narrow track width and signals can be recorded or reproduced with high S/N ratio, it is necessary to perform accurate scanning by the tracking servo technique.

In a large capacity magnetic recording medium such as a hard disk or a removable type magnetic recording medium, servo signal for tracking or address information signal, reproduction clock signal, etc. are recorded with a certain spacing between them within one turn of the disk. This is the so-called pre-format.

By reading this pre-formatted signal and by correcting its own position, the magnetic head can run accurately on the track.

In the mode of pre-formatting currently in practice, disks are recorded one by one and track by track using a special-purpose servo recorder. However, there are problems in that the servo recorder are expensive and long time is required for the preparation of the pre-format and this means longer time for manufacture and higher manufacturing cost.

In this respect, a method has been proposed to perform magnetic transfer without carrying out pre-format for each track. For example, a transfer technique is described in Japanese Patent Publications Laid-Open 63-183623, 10-40544, and 10-269566. However, none of these inventions provides a proposal suitable for practical applications. There has been no disclosure on concrete means or conditions such as the condition of magnetic field to be applied at the magnetic transfer in the method for magnetic transfer or the means for generating the magnetic field.

To solve the problems as described above, the following method has been proposed in Japanese Patent Publications Laid-Open 63-183623 and 10-40544: On the surface of the substrate, surface irregularities (i.e. recesses and projections; concave portions and convex portions) corresponding to information signals are formed. The surface of the master carrier for magnetic transfer where ferromagnetic thin film is formed at least on the projections is brought into contact with the surface of sheet-type or disk-type magnetic recording medium where ferromagnetic thin film or ferromagnetic powder coating layer is formed. Or, AC bias magnetic field or DC magnetic field is applied to excite ferromagnetic material which constitutes the surface of the projections. As a result, magnetized pattern to match the surface irregularities is recorded on the magnetic recording medium.

According to this method, the surface of the projected portions of the master carrier for magnetic transfer is brought closely together to the magnetic recording medium to be pre-formatted, i.e. the slave medium, and the ferromagnetic material which constitutes the projected portions is excited. As a result, the desired format is formed on the slave medium. By this method, recording can be carried out statically without changing relative positions of the master carrier for magnetic transfer and the slave medium, and accurate pre-format recording can be performed. Also, the time required for the recording is very short. Specifically, in the method for recording from the magnetic head as described above, the time of several minutes to several tens of minutes is normally required, while magnetic transfer can be completed within one second regardless of the recording capacity or recording density in this magnetic transfer method.

Figure 1:
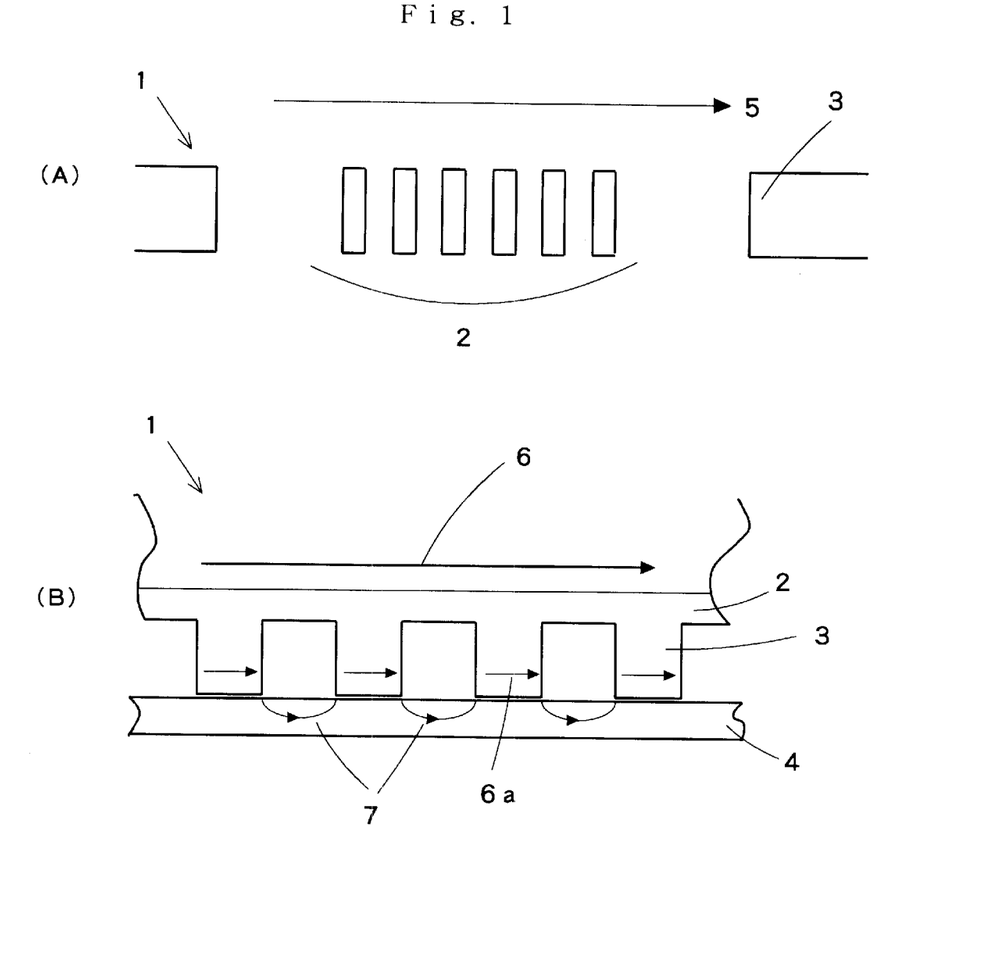
FIG. 1 represents drawings to explain transfer of a pattern for pre-format on a master carrier for magnetic transfer.

Now, description will be given on the transfer of pattern for pre-format in the master carrier for magnetic transfer referring to FIG. 1. FIG. 1(A) is a schematical plan view to explain magnetic layer surface of the master carrier for magnetic transfer, and FIG. 1(B) is a cross-sectional view to explain the process of transfer.

On a certain area of the track of the master carrier 1 for magnetic transfer, a pre-format region 2 and a data region 3 where patterns of servo signals and address signal for tracking to be transferred are formed. By bringing the master carrier 1 for magnetic transfer and the slave medium 4 closely together and by applying an external magnetic field 6 for transfer in track direction 5, the pre-format information can be transferred to the slave medium as a recording information 7. Thus, the slave medium can be manufactured with high efficiency.

However, it has been made clear that, when magnetic transfer is performed according to this method, the quality of information signal may be deteriorated, and that servo action may be inaccurate.

SUMMARY OF THE INVENTION

It is an object of the present invention to provide a method and an apparatus for stable magnetic transfer by bringing a master carrier for magnetic transfer and a slave medium closely together and by transferring a pre-format pattern through application of an external magnetic field in order to prevent inaccurate servo operation of the slave medium.

The present invention provides a method for magnetic transfer by bringing a master carrier for magnetic transfer with a slave medium and by applying magnetic field for transfer, said master carrier having a magnetic layer on surface of a substrate corresponding to an information signal, and said slave medium comprising a magnetic recording medium where the information is to be transferred, said method comprising the steps of:

arranging permanent magnets each having magnetic field symmetrical to the axis of the magnetic pole at least on one of upper or lower surfaces of the slave medium with the axis of the magnetic pole disposed in parallel to the surface of the slave medium;

rotating the slave medium or the permanent magnet in track direction;

performing initial DC magnetization on the slave medium in advance in track direction, and bringing the master carrier for magnetic transfer closely together with the slave medium processed by said initial DC magnetization; and performing magnetic transfer by applying magnetic field for transfer in track direction reverse to the direction of the initial DC magnetization on the surface of the slave medium.

Further, the present invention provides a method for magnetic transfer by bringing a master carrier for magnetic transfer with a slave medium and by applying magnetic field for transfer, said master carrier having a magnetic layer on surface of a substrate corresponding to an information signal, and said slave medium comprising a magnetic recording medium where the information is to be transferred, said method comprising the steps of:

applying magnetic field on the surface of the slave medium in track direction, performing initial DC magnetization in advance in track direction on the slave medium, and bringing the master carrier for magnetic transfer with the slave medium processed by said initial DC magnetization closely together;

arranging permanent magnets having magnetic field symmetrical to the axis of the magnetic pole at least on one of upper or lower surfaces of the slave medium with the axis of the magnetic pole running in parallel to the surface of the slave medium;

rotating the permanent magnet or the slave medium closely combined with the master carrier for magnetic transfer in track direction; and performing magnetic transfer by applying magnetic field for transfer in track direction reverse to the direction of the initial DC magnetization.

Also, the present invention provides a method for magnetic transfer as described above, wherein, when said permanent magnets each having magnetic field symmetrical to the axis of the magnetic pole are arranged at least on one of upper or lower surfaces of the slave medium with the axis of the magnetic pole running in parallel to the surface of the slave medium, the magnetic field intensity distribution in track direction of the magnetic field generated is such that there is at least one point where the magnetic field intensity is higher than the coercive force Hcs of the slave medium on a position in track direction.

Further, the present invention provides a method for magnetic transfer as described above, wherein, when said permanent magnets each having magnetic field symmetrical to the axis of the magnetic pole are arranged at least on one of upper or lower surfaces of the slave medium with the axis of the magnetic pole running in parallel to the surface of the slave medium, the magnetic field intensity distribution in track direction of the magnetic field generated is such that magnetic field intensity higher than the coercive force Hcs of the slave medium is present only in one direction on a position in track direction, and the magnetic field intensity in reverse direction is lower than the coercive force Hcs of the slave medium at any position in any track direction.

Also, the present invention provides a method for magnetic transfer as described above, wherein, when said permanent magnets each having magnetic field symmetrical to the axis of the magnetic pole are arranged at least on one of upper or lower surfaces of the slave medium with the axis of the magnetic pole running in parallel to the surface of the slave medium, the magnetic field intensity distribution in track direction of the magnetic field generated is such that magnetic field intensity higher than the maximum value of the optimal transfer magnetic field intensity range is not present at any position in any track direction, magnetic field intensity within the optimal transfer magnetic field intensity range is present at least at one point in one track direction, and magnetic field intensity in track direction reverse thereto is lower than the minimum value of the optimal transfer magnetic field intensity range at any position in any track direction.

Further, the present invention provides a method for magnetic transfer as described above, wherein the optimal transfer magnetic field intensity is 0.6×Hcs to 1.3×Hcs with respect to the coercive force Hcs of the slave medium.

Also, the present invention provides an apparatus for magnetic transfer by bringing a master carrier for magnetic transfer and a slave medium closely together and by applying magnetic field for transfer, said master carrier having a magnetic layer on surface of a substrate corresponding an information signal, and said slave medium comprising a magnetic recording medium where the information is to be transferred, said apparatus comprising initial DC magnetizing means for arranging permanent magnets each having magnetic field symmetrical to the axis of the magnetic pole at least on one of upper or lower surfaces of the slave medium with the axis of the magnetic pole running in parallel to the surface of the slave medium, for rotating the slave medium or the permanent magnet in track direction, and for applying magnetic field in track direction on the surface of the slave medium to perform initial DC magnetization of the slave medium in advance in track direction, combining means for combining the master carrier for magnetic transfer with the slave medium processed by said initial DC magnetization, and transfer magnetic field applying means for applying magnetic field for transfer in track direction reverse to the direction of the initial DC magnetization on the surface of the slave medium.

Further, the present invention provides an apparatus for magnetic transfer by bringing a master carrier for magnetic transfer and a slave medium closely together and by applying magnetic field for transfer, said master carrier having a magnetic layer on surface of a substrate corresponding an information signal, and said slave medium comprising a magnetic recording medium where the information is to be transferred, said apparatus comprising initial DC magnetizing means for applying magnetic field in track direction on the surface of the slave medium and for performing initial DC magnetization in advance in track direction of the slave medium, combining means for combining the master carrier for magnetic transfer with the slave medium processed by said initial DC magnetization, and transfer magnetic field applying means for arranging permanent magnets each having magnetic field symmetrical to the axis of the magnetic pole at least on one of upper or lower surfaces of the slave medium with the axis of the magnetic pole running in parallel to the surface of the slave medium, for rotating said permanent magnets or the collective unit comprising said master carrier for magnetic transfer combined with said slave medium in track direction, and for applying magnetic field for transfer in track direction reverse to the direction of the initial DC magnetization.

Also, the present invention provides an apparatus for magnetic transfer as described above, wherein, when said permanent magnets each having magnetic field symmetrical to the axis of the magnetic pole are arranged at least on one of upper or lower surfaces of the slave medium with the axis of the magnetic pole running in parallel to the surface of the slave medium, magnetic field intensity distribution in track direction of the magnetic field generated is such that magnetic field intensity higher than the coercive force Hcs of the slave medium is present at least at one point on a position in track direction.

Further, the present invention provides an apparatus for magnetic transfer as described above, wherein, when said permanent magnets each having magnetic field symmetrical to the axis of the magnetic pole are arranged at least on one of upper or lower surfaces of the slave medium with the axis of the magnetic pole running in parallel to the surface of the slave medium, magnetic field intensity distribution in track direction of the magnetic field generated is such that magnetic field intensity higher than the coercive force Hcs of the slave medium is present only in one direction at a position in track direction, and magnetic field intensity in reverse direction is lower than the coercive force Hcs of the slave medium at any position in track direction.

Also, the present invention provides an apparatus for magnetic transfer as described above, wherein, when said permanent magnets each having magnetic field symmetrical to the axis of the magnetic pole are arranged at least on one of upper or lower surfaces of the slave medium with the axis of the magnetic pole running in parallel to the surface of the slave medium, magnetic field intensity distribution in track direction of the magnetic field generated is such that magnetic field intensity higher than the maximum value of the optimal transfer magnetic field intensity range is not present at any position in any track direction, magnetic field intensity within the optimal transfer magnetic field intensity range is present at least at one point in one track direction, and magnetic field intensity in track direction reverse thereto is lower than the minimum value of the optimal transfer magnetic field intensity range at any position in any track direction.

Further, the present invention provides an apparatus for magnetic transfer as described above, wherein the optimal transfer magnetic field intensity is 0.6×Hcs to 1.3×Hcs with respect to the coercive force Hcs of the slave medium.

DESCRIPTION OF THE PREFERRED EMBODIMENT

When a master carrier for magnetic transfer and a slave medium are brought closely together and a magnetic field for transfer is applied from outside, magnetic transfer operation is unstable and a portion with signals of poor quality is produced as the result of transfer. Having found that the quality of signals is decreased because the magnetic field applied at the time of transfer is not adequate, the present inventors have conceived the present invention.

In the magnetic transfer from the master carrier for magnetic transfer to the slave medium, it has been believed in the past that, when an external magnetic field higher than the coercive force Hcs of the slave medium is applied, the slave medium is magnetized all in applied direction, and this is the reason why the pattern to be transferred is not recorded. For example, in Japanese Patent Publication Laid-Open 10-40544, it is described in the paragraph 0064 that it is preferable to have coercive force equal to or lower than the coercive force of the magnetic recording medium.

However, the present inventors have found the following principle after elaborate study. The principle of magnetic transfer according to the present system is as follows: As shown in FIG. 1, in a convex portion of a magnetic layer of a master carrier 1 for magnetic transfer, which is substantially in contact with a slave medium 4, an external magnetic field 6 for transfer is turned to a magnetic field 6a which is absorbed to the convex portion, and the recordable magnetic field intensity is not attained on the magnetic layer of the slave medium 4 in contact. However, on the magnetic layer of the slave medium 4 corresponding to a concave portion of the master carrier 1 for magnetic transfer not in contact with the slave medium 4, the recordable magnetic field intensity is attained. As shown by reference numeral 7 in the figure, magnetization occurs in a direction of the external magnetic field 6 for transfer, and a pattern for pre-format of the master carrier 1 for magnetic transfer can be transferred to the slave medium 4 as a recording information 7.

Therefore, when transfer is performed from the master carrier for magnetic transfer to the slave medium, in the portion in contact with the slave medium, most of the magnetic field enters the pattern portion of the master carrier for magnetic transfer, and it appears that no inversion occurs even when transfer magnetic field higher than the coercive force Hcs of the slave medium is applied. By applying magnetic field for transfer having intensity in specific relation to the coercive force Hcs of the slave medium, it is possible to obtain a slave medium with the signal of high quality.

In order to achieve clear and distinct transfer in any type of pattern, initial DC magnetization should be performed on the slave medium in advance with sufficiently high magnetic field to magnetize to higher than the coercive force Hcs, or more preferably, to more than 1.2 times of Hcs. And magnetic field for transfer with specific intensity, i.e. a magnetic field within optimal transfer magnetic field intensity range, should be applied. The preferable magnetic field for transfer is given as:

$$0.6 \times Hcs \leq \text{Magnetic field for transfer} \leq 0.6 \times Hcs$$

It should be applied in a direction reverse to the direction of the initial DC magnetization.

More preferably, the magnetic field for transfer has coercive force of 0.8–1.2 Hcs, or most preferably, 1–1.1 Hcs.

The magnetic recording medium for per-forming pre-format for servo is a disk-type recording medium, and information is recorded along a track, which is formed concentrically from the center of rotation. To apply the magnetic field to transfer a radial pattern in the disk-type magnetic recording medium as described above, the magnetic field is applied in the direction of the track on the slave medium surface, i.e. in tangential direction of a circular arc at a position in arbitrary track direction, and initial DC magnetization is performed in track direction of the slave medium.

Next, the master carrier for magnetic transfer and the slave medium processed by the initial DC magnetization are brought closely together, and the magnetic field for transfer is applied in the direction of track on the slave medium surface. In this case, the direction of the initial DC magnetization when magnetic field is applied in the direction of track on the slave medium must be reverse to the direction of the magnetic field for transfer applied for magnetic transfer on the slave medium surface.

Therefore, in order to apply the magnetic field under the above condition for applying magnetic field all over the entire surface of the disk-type medium, a magnetic field of such magnetic field intensity distribution that magnetic field intensity is higher than the coercive force Hcs of the slave medium at least at one point on a position in track direction is generated on a part of the track direction. By rotating the slave medium or the magnetic field by one turn in the track direction, the initial DC magnetization can be achieved.

Also, a magnetic field with such magnetic field intensity distribution is generated on a portion in the track direction that it has a portion with magnetic field intensity of higher than the coercive force Hcs of the slave medium only in one direction at a position in the track direction and that magnetic field intensity in reverse direction is lower than the coercive force Hcs of the slave medium at any position of the track direction. By rotating the slave medium or the magnetic field by one turn in the track direction, a magnetic field for initial DC magnetization can be applied in the track direction of the slave medium in advance.

Further, a magnetic field with such magnetic field intensity distribution is generated on a portion of the track direction that magnetic field intensity higher than the maximum value of the optimal transfer magnetic field intensity range is not present at any position in the track direction and the portion with magnetic field within the optimal transfer magnetic field intensity range is present at least at one point in one track direction and magnetic field intensity reverse to the track direction is lower than the minimum value in the optimal transfer magnetic intensity range at any position of the track direction. The master carrier for magnetic transfer and the slave medium subjected to the initial DC magnetization are brought closely together, and this is rotated in the track direction or the magnetic field is rotated in the track direction. Thus, by applying the magnetic field for transfer in the track direction on the slave medium surface, this can be accomplished.

The permanent magnet used for the initial DC magnetization and magnetic transfer is preferably in such size as to be equal to or longer than the distance from a track on one end of the slave medium to a track on the other end. In case of a disk-type slave medium, it is preferable that it is in such size as to be equal to or longer than the radial distance from the outermost track to the innermost track of the slave medium. When a permanent magnet of such size is used, it is possible to apply uniform magnetic field on the slave medium surface simply by moving the slave medium or the closely fitted group or the collective unit of the slave medium and the master carrier for magnetic transfer or the permanent magnet in one direction all over the total length of the track or by rotating by one turn.

Also, the magnetic field intensity to be applied using the permanent magnet must be uniform at any position all over the track. Its variation is preferably within ±5% at any position over the entire track, or more preferably within ±2.5%.

In the following, description will be given on a method for transfer and an apparatus for transfer.

Figure 2:
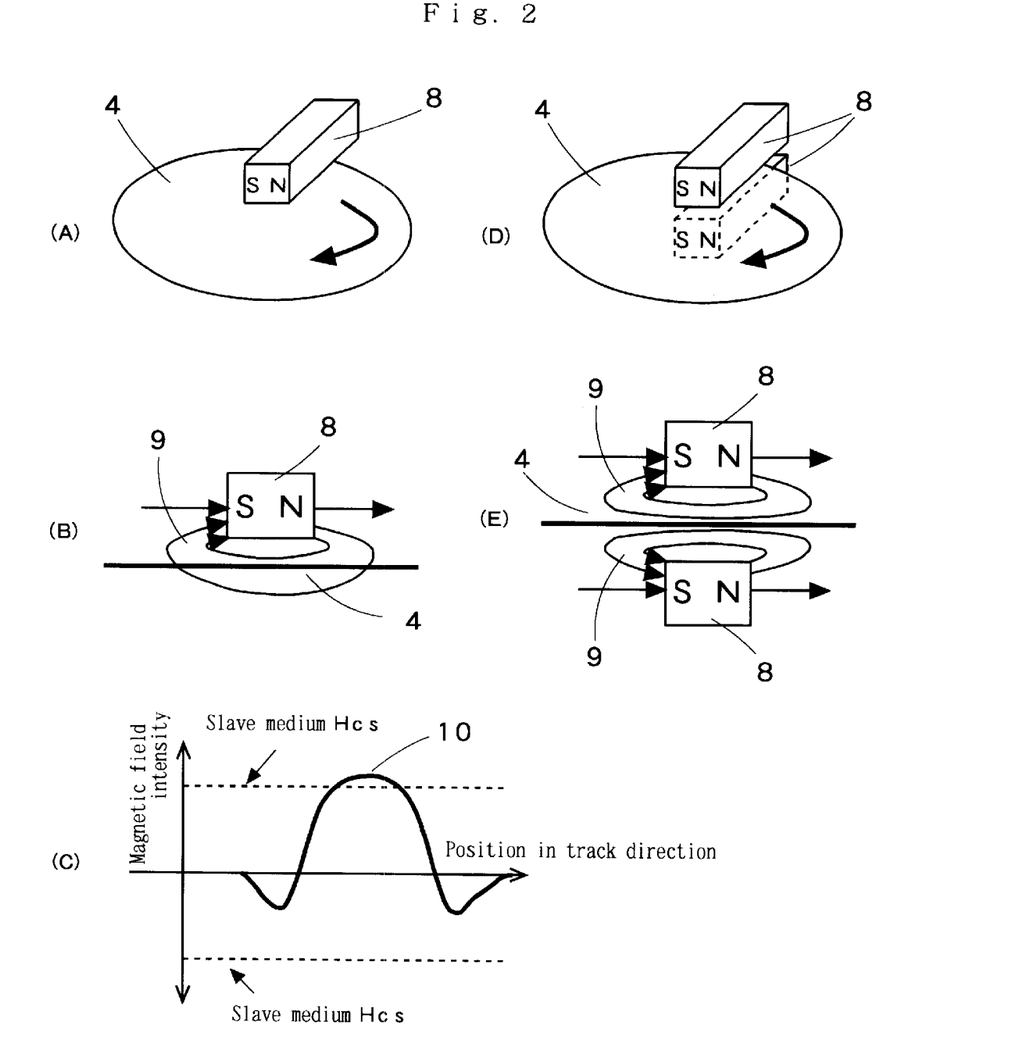
FIG. 2 represents drawings to explain a method for applying magnetic field using permanent magnets each directed in lateral direction.

FIG. 2 represents drawings to explain a method for applying magnetic field using permanent magnets each directed in lateral direction. FIG. 2(A) shows an example where a single permanent magnet 8 having magnetic field symmetrical to the axis of the magnetic pole is arranged on upper surface of a slave medium 4 with the axis of the magnetic pole running in parallel to the surface of the slave medium 4 and the slave medium 4 is rotated.

From a single permanent magnet 8 disposed on the upper surface of the slave medium 4, a magnetic field 9 is applied as shown in FIG. 2(B) to the surface of the slave medium 4.

FIG. 2(C) is a diagram showing magnetic field intensity to be applied on the slave medium. In the magnetic field applied on the slave medium, a peak value 10 higher than the coercive force Hcs of the slave medium is present. By rotating the slave medium or the magnet, initial DC magnetization can be performed on the slave medium.

FIG. 2(D) shows an example where permanent magnets 8 each having magnetic field symmetrical to the axis of the magnetic pole are arranged on upper and lower surfaces of the slave medium 4 respectively with the axis of the magnetic pole running in parallel to the surface of the slave medium 4 and with direction of the axis of the magnetic pole of each of the magnets aligned in the same direction, and the slave medium 4 is rotated. From each of the permanent magnets 8 arranged on upper and lower surfaces of the slave medium 4 respectively, a magnetic field 9 is applied to the surface of the slave medium 4 as shown in FIG. 2(E).

Figure 3:
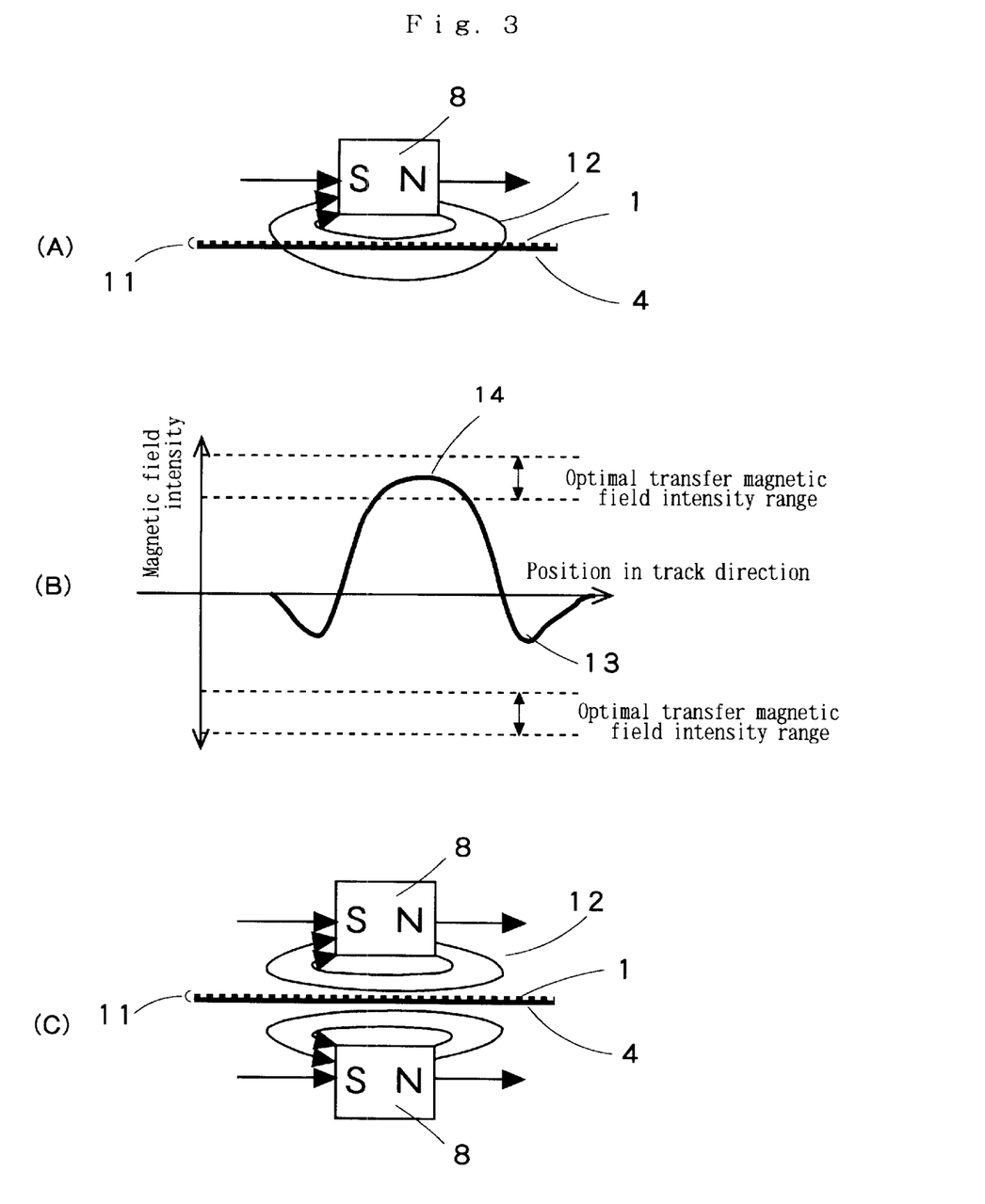
FIG. 3 represents drawings to explain a method to transfer a pattern from a master carrier for magnetic transfer to a slave medium.

FIG. 3 represents drawings to explain a method for transferring a pattern from the master carrier for magnetic transfer to the slave medium.

FIG. 3(A) is a drawing to explain application of magnetic field to a collective unit comprising the slave medium and the master carrier for magnetic transfer. FIG. 3(B) is a diagram showing intensity of magnetic field given by the application of the magnetic field of FIG. 3(A).

On the surface of a collective unit 11 combining the slave medium 4 closely together with the master carrier 1 for magnetic transfer, a single permanent magnet 8 is arranged, which has magnetic field symmetrical to the axis of the magnetic field and capable to apply a magnetic field higher than the coercive force Hcs of the slave medium in track direction. By applying a magnetic field 12 and by rotating at least one of the collective unit 11 or the permanent magnet 8 in track direction with respect to the central axis of the collective unit 11, a magnetic field in a direction reverse to the direction of the initial DC magnetization is applied to the entire surface of the collective unit 11.

In the applied magnetic field, a peak value 13 with lower intensity gives no influence on the transfer of the pattern from the master carrier for magnetic transfer to the slave medium. Only a peak value 14 with higher intensity contributes to the magnetic transfer.

Also, by applying a magnetic field within the optimal transfer magnetic field intensity range from the master carrier for magnetic transfer to the slave medium, the peak value 14 with higher intensity can provide a good pattern regardless of the configuration of the pattern.

FIG. 3(C) shows a condition where permanent magnets 8 are arranged, each of which has a magnetic field symmetrical to the axis of the magnetic pole disposed on both surfaces of the collective unit 11, each of said permanent magnets being able to apply a magnetic field higher than the coercive force Hcs of the slave medium in track direction, and a magnetic field 12 is applied. Under this condition, by rotating at least one of the collective unit 11 or the permanent magnets 8 in track direction with respect to the central axis of the collective unit 11, a magnetic field reverse to the direction of the initial DC magnetization is applied to the entire surface of the collective unit 11, and a peak value with higher intensity of the magnetic field contributes to the magnetic transfer.

In the apparatus used in the method for magnetic transfer as shown in FIG. 2 and FIG. 3, there is provided a mechanism for adjusting a distance between the slave medium surface and the permanent magnet as desired. By adjusting the distance between the slave medium and the permanent magnet, it is possible to obtain the magnetic field intensity as desired on the surface of the slave medium.

Now, description will be given on a method to manufacture the master carrier for magnetic transfer to be used in the magnetic transfer of the present invention.

As a substrate for the master carrier for magnetic transfer, a planar member with flat and smooth surface, which is made of silicon, quartz plate, glass, non-magnetic metal such as aluminum or alloy, ceramics, synthetic resin, etc., and which has enough resistance to processing environment such as temperature in etching and film forming processes may be used.

On a substrate with flat and smooth surface, photoresist is coated, and light exposure or development is performed using a photo mask to match the pattern of pre-format. Or, the photoresist is directly marked, and a pattern corresponding to the pre-format information is formed.

Next, in the etching process, etching of the substrate is performed corresponding to the pattern by etching means such as reactive etching, physical etching using argon plasma, or etching using liquid.

The depth of the hole to be formed by the etching should be a depth corresponding to thickness of a magnetic layer formed as a transfer information recording portion. It is preferably 20–1000 nm. If it is too thick, spreading width of the magnetic field becomes too large, and this is not desirable.

The holes to be formed have preferably uniform depth so that bottom surface can be formed with a surface plane which runs in parallel to the surface of the substrate.

Also, the hole has preferably such a shape that its cross-section in the track direction perpendicular to the surface is of rectangular shape.

Next, the magnetic material is processed by vacuum film forming means such as vacuum deposition method, sputtering method, ion plating method, and a film of magnetic material is formed up to the surface of the substrate in thickness to correspond to the formed hole. Magnetic characteristics of the transfer information recording portion are as follows: coercive force (Hcs) not more than 2500 Oe, or more preferably, 5–1500 Oe; saturation magnetic flux density (Bs) not less than 0.3 T (Tesla), or more preferably, not less than 0.5 T.

Then, photoresist is removed by lift-off method. The surface is polished, and burrs are removed if any, and the surface is flattened.

In the above, description has been given on the method to form holes on the substrate and to form a film of magnetic material in the holes thus formed. It may be designed in such manner that the film of magnetic material is formed at predetermined points on the substrate by photo-fabrication method to make convex portions on the transfer information recording portion, and non-magnetic material is the formed in film or is filled between the convex portions, and the surface may be made on the same level as the non-magnetic material portion of the transfer information recording portion.

As the magnetic material to be used in the magnetic layer, cobalt, iron or their alloys having high magnetic flux density may be used. More concretely, Co, CoPtCr, CoCr, CoPtCrTa, CoPtCrNbTa, CoCrB, CoNi, Fe, FeCo, FePt, etc. may be used.

The thickness of the magnetic layer is preferably 20–1000 nm, or more preferably, 30–500 nm. If it is too thick, resolution of recording is decreased.

In particular, it is preferable for the purpose of providing clear transfer that magnetic flux density is high and it is in the same direction as the slave medium, e.g. in intra-surface direction in case of intra-surface recording, and to have magnetic anisotropy in vertical direction in case of vertical recording. It is preferable that the magnetic material has a structure of fine magnetic particles or amorphous structure because sharp edge can be produced.

In order to provide magnetic anisotropy on the magnetic material, it is preferable to have a non-magnetic underlayer, and crystal structure and lattice constant should be the same as those of the magnetic layer. More concretely, Cr, CrTi, CoCr, CrTa, CrMo, NiAl, Ru, etc. may be used to form the film by sputtering.

A protective film such as a diamond-like carbon film may be formed on the magnetic layer, and lubricant may be provided. As the protective film, it is more preferable that diamond-like carbon film of 5–30 nm and lubricant are present. The reason why lubricant must be provided is as follows: When deviation is caused during the contact process with the slave medium and this deviation is to be corrected, friction occurs, and if there is no lubricant layer, durability may be decreased.

The master carrier for magnetic transfer according to the present invention can be used not only in the transfer of magnetic recording information to a disk-type magnetic recording medium such as hard disk, large capacity removable type magnetic recording medium, etc. but also in the transfer of magnetic recording information to a card-type magnetic recording medium or a tape-type magnetic recording medium.

Embodiments

In the following, description will be given in detail on the present invention by referring to examples.

EXAMPLE 1 AND COMPARATIVE EXAMPLE 1

Preparation of Master Carrier for Magnetic Transfer

In a vacuum film-making apparatus, pressure was reduced to $10^{-7}$ Torr at room temperature, and argon was then introduced to turn the pressure to $3 \times 10^{-3}$ Torr. Then, a film of FeCo of 200 nm in thickness was formed on a silicon substrate, and this was used as a disk-type master carrier for magnetic transfer of 3.5 inches in diameter.

It had coercive force Hc of 100 Oe and magnetic flux density (Ms) of 23000 Gauss.

A disk-like pattern was formed by radial lines extending from the center of the disk to a position of 20–40 mm in radial direction with equal spacing of 10μ in width. The spacing of the lines was set to 10 μm at the innermost position, i.e. 20 mm in radial direction.

Preparation of the Slave Medium

In a vacuum film-making apparatus, pressure was reduced to $10^{-7}$ Torr at room temperature, and argon was then introduced to turn the pressure to $3 \times 10^{-3}$ Torr. Then, a glass plate was heated up to 200° C., and a disk-type magnetic recording medium of 3.5 inches in diameter was prepared, which had CoCrPt of 25 nm, Ms of 4500 Gauss, and coercive force (Hcs) of 2500 Oe.

Initial DC Magnetization Method

Permanent magnets were arranged on both surfaces of the slave medium respectively as shown in FIG. 2 so that peak magnetic field intensity on the surface of the slave medium was to be 5000 Oe, i.e. two times as much as the coercive force Hcs of the slave medium, and initial DC magnetization of the slave medium was performed.

Magnetic Transfer Test Method

The slave medium under initial DC magnetization and the master carrier for magnetic transfer were brought closely together. Using an apparatus with the permanent magnets arranged on both surfaces as shown in FIG. 3(C), magnetic field was applied in reverse direction to the magnetization of the slave medium, and magnetic transfer was performed. To bring the master carrier for magnetic transfer and the slave medium closely together, these were squeezed with a rubber plate interposed between them, and pressure was applied on an aluminum plate.

Method to Evaluate Electromagnetic Transfer Characteristics

An electromagnetic transfer characteristics measuring system (manufactured by Kyodo Electronics; SS-60) was used to evaluate transfer signal of the slave medium. An MR head with the following performance data was used: reproducing head gap 0.33 μm; reproduction track width 2.6 μm; recording head gap 0.4 μm; and recording track width 3.5 μm.

Reading signal was processed by a spectro-analyzer for frequency analysis, and a difference (C/N) between peak intensity of primary signal (C) and extrapolated medium noise (N) was determined. In the values of C/N at each magnetic field intensity, relative value of ΔC/N was evaluated with the maximum value at 0 dB. The results are shown in Table 1. When the value of C/N was not more than −20 dB, signal quality of magnetic transfer did not reach the level for practical use, and this was indicated with the mark *.

TABLE 1

| Hcs of slave medium: 2500 Oe Peak intensity of magnetic field for transfer (Oe) | Ratio to Hcs | ΔC/N (dB) |
| --- | --- | --- |
| 750 | 0.3 | * |
| 1,250 | 0.5 | −10.2 |
| 1,500 | 0.6 | −4.3 |
| 2,000 | 0.8 | −1.7 |
| 2,250 | 0.9 | −0.3 |
| 2,500 | 1.0 | 0.0 |
| 2,750 | 1.1 | −0.2 |
| 3,000 | 1.2 | −1.4 |
| 3,250 | 1.3 | −3.8 |
| 3,500 | 1.4 | −9.6 |
| 3,750 | 1.5 | −15.8 |
| 4,000 | 1.6 | * |
| 5,000 | 2.0 | * |

EXAMPLE 2 AND COMPARATIVE EXAMPLE 2

To a slave medium having coercive force (Hcs) of 2500 Oe, magnetic transfer was carried out by the same procedure as in Example 1 except that initial DC magnetization of the slave medium was performed with peak magnetic field intensity of 3000 Oe, i.e. magnetic field intensity 1.2 times as high as the coercive force (Hcs) of the slave medium. Then, the slave medium under initial DC magnetization and the master carrier for magnetic transfer were brought closely together and magnetic transfer was performed. The magnetic transfer pattern was developed by the same procedure as in Example 1, and measurement was made. The results are summarized in Table 2. The peak intensity of the magnetic field for transfer shows a peak value in the magnetic field intensity distribution shown in FIG. 3.

TABLE 2

| Hcs of slave medium: 2500 Oe Peak intensity of magnetic field for transfer (Oe) | Ratio to Hcs | ΔC/N (dB) |
| --- | --- | --- |
| 750 | 0.3 | * |
| 1,250 | 0.5 | −10.5 |
| 1,500 | 0.6 | −2.2 |
| 2,000 | 0.8 | −0.1 |
| 2,250 | 0.9 | −0.2 |
| 2,500 | 1.0 | −0.1 |
| 2,750 | 1.1 | 0.0 |
| 3,000 | 1.2 | −1.2 |
| 3,250 | 1.3 | −1.9 |
| 3,500 | 1.4 | −7.5 |
| 3,750 | 1.5 | −10.8 |
| 4,000 | 1.6 | * |
| 5,000 | 2.0 | * |

COMPARATIVE EXAMPLE 3

To a slave medium having coercive force (Hcs) of 2500 Oe, magnetic transfer was performed by the same procedure as in Example 1 except that initial DC magnetization was performed with peak magnetic field intensity of 2000 Oe, i.e. with magnetic intensity 0.8 time as high as the coercive force (Hcs) of the slave medium. Then, the slave medium processed by initial DC magnetization and the master carrier for magnetic transfer were closely brought together, and magnetic transfer was performed. By the same procedure as in Example 1, the magnetic transfer pattern was developed, and measurement was made. The results are shown in Table 3.

TABLE 3

| Hcs of slave medium: 2500 Oe Peak intensity of magnetic field for transfer (Oe) | Ratio to Hcs | ΔC/N (dB) |
| --- | --- | --- |
| 750 | 0.3 | * |
| 1,250 | 0.5 | * |
| 1,500 | 0.6 | * |
| 2,000 | 0.8 | * |
| 2,250 | 0.9 | * |
| 2,500 | 1.0 | * |
| 2,750 | 1.1 | * |
| 3,000 | 1.2 | * |
| 3,250 | 1.3 | * |
| 3,500 | 1.4 | * |
| 3,750 | 1.5 | * |
| 4,000 | 1.6 | * |
| 5,000 | 2.0 | * |

EXAMPLE 3 AND COMPARATIVE EXAMPLE 4

To a slave medium having coercive force (Hcs) of 2000 Oe prepared by the same procedure as in Example 1, magnetic transfer was performed by the same procedure as in Example 1 except that initial DC magnetization of the slave medium was performed with peak magnetic field intensity of 4000 Oe, i.e. magnetic field intensity 2 times as high as the coercive force (Hcs) of the slave medium, and the slave medium processed by initial DC magnetization was brought together closely with the master carrier for magnetic transfer, and magnetic transfer was performed using a system shown in FIG. 3. Then, the magnetic transfer pattern was developed and measurement was made by the same procedure as in Example 1. The results are shown in Table 4. The peak intensity of the magnetic field for transfer shows a peak value in the magnetic field intensity distribution shown in FIG. 3.

TABLE 4

Hcs of slave medium: 2000 Oe
Peak intensity of magnetic

| field for transfer (Oe) | Ratio to Hcs | ΔC/N (dB) |
|---|---|---|
| 600 | 0.3 | * |
| 1,000 | 0.5 | −10.6 |
| 1,200 | 0.6 | −3.2 |
| 1,600 | 0.8 | −0.8 |
| 1,800 | 0.9 | 0.0 |
| 2,000 | 1.0 | −0.2 |
| 2,200 | 1.1 | −1.1 |
| 2,400 | 1.2 | −2.3 |
| 2,600 | 1.3 | −4.6 |
| 2,800 | 1.4 | −9.6 |
| 3,000 | 1.5 | −15.6 |
| 3,200 | 1.6 | * |
| 4,000 | 2.0 | * |

EXAMPLE 4 AND COMPARATIVE EXAMPLE 5

To a slave medium having coercive force (Hcs) of 2000 Oe, magnetic transfer was performed by the same procedure as in Example 4 except that initial DC magnetization of the slave medium was performed with peak magnetic field intensity of 2400 Oe, i.e. magnetic field intensity 1.2 times as high as the coercive force (Hcs) of the slave medium, and the slave medium processed by initial DC magnetization was brought closely together with the master carrier for magnetic transfer. Then, the magnetic transfer pattern was developed by the same procedure, and measurement was made. The results are shown in Table 5.

TABLE 5

Hcs of slave medium: 2000 Oe
Peak intensity of magnetic

| field for transfer (Oe) | Ratio to Hcs | ΔC/N (dB) |
|---|---|---|
| 600 | 0.3 | * |
| 1,000 | 0.5 | −15.2 |
| 1,200 | 0.6 | −6.3 |
| 1,600 | 0.8 | −5.6 |
| 1,800 | 0.9 | −0.1 |
| 2,000 | 1.0 | 0.0 |
| 2,200 | 1.1 | −0.2 |
| 2,400 | 1.2 | −1.8 |
| 2,600 | 1.3 | −2.5 |
| 2,800 | 1.4 | −8.6 |
| 3,000 | 1.5 | −16.3 |
| 3,200 | 1.6 | * |
| 4,000 | 2.0 | * |

COMPARATIVE EXAMPLE 6

To a slave medium having coercive force (Hcs) of 2000 Oe prepared by the same procedure as in Example 1, magnetic transfer was performed by the same procedure as in Example 1 except that initial DC magnetization of the slave medium was performed with peak magnetic field intensity of 1600 Oe, i.e. with magnetic field intensity 0.8 time as high as the coercive force (Hcs) of the slave medium, and the slave medium processed by initial DC magnetization was brought closely together with the master carrier for magnetic transfer, and magnetic transfer was performed using a system shown in FIG. 4. Then, the magnetic transfer pattern was developed, and measurement was made by the same procedure as in Example 1. The results are summarized in Table 6.

TABLE 6

Hcs of slave medium: 2000 Oe
Peak intensity of magnetic

| field for transfer (Oe) | Ratio to Hcs | ΔC/N (dB) |
|---|---|---|
| 600 | 0.3 | * |
| 1,000 | 0.5 | * |
| 1,200 | 0.6 | * |
| 1,600 | 0.8 | * |
| 1,800 | 0.9 | * |
| 2,000 | 1.0 | * |
| 2,200 | 1.1 | * |
| 2,400 | 1.2 | * |
| 2,600 | 1.3 | * |
| 2,800 | 1.4 | * |
| 3,000 | 1.5 | * |
| 3,200 | 1.6 | * |
| 4,000 | 2.0 | * |

In the magnetic transfer from the master carrier for magnetic transfer to the slave medium, by applying magnetic field for transfer with a specific intensity to the coercive force (Hcs) of the slave medium, it is possible to obtain a transfer pattern with excellent quality on the slave medium regardless of position or configuration of the pattern.

We claim:

1. A method for magnetic transfer by bringing a master carrier for magnetic transfer with a slave medium and by applying magnetic field for transfer, said master carrier having a magnetic layer on surface of a substrate corresponding to an information signal, and said slave medium comprising a magnetic recording medium where the information is to be transferred, said method comprising the steps of:

arranging permanent magnets each having magnetic field symmetrical to the axis of the magnetic pole at least on one of upper or lower surfaces of the slave medium with the axis of the magnetic pole disposed in parallel to the surface of the slave medium;

rotating the slave medium or the permanent magnet in track direction;

performing initial DC magnetization on the slave medium in advance in track direction, and bringing the master carrier for magnetic transfer closely together with the slave medium processed by said initial DC magnetization; and performing magnetic transfer by applying magnetic field for transfer in track direction reverse to the direction of the initial DC magnetization on the surface of the slave medium, wherein, when said permanent magnets each having magnetic field symmetrical to the axis of the magnetic pole are arranged at least on one of upper or lower surfaces of the slave medium with the axis of the magnetic pole running in parallel to the surface of the slave medium, the magnetic field intensity distribution in track direction of the magnetic field generated is such that magnetic field intensity higher than the coercive force Hcs of the slave medium is present only in one direction on a position in track direction, and the magnetic field intensity in reverse direction is lower than the coercive force Hcs of the slave medium at any position in any track direction.

2. A method for magnetic transfer according to claim 1, wherein, when said permanent magnets each having magnetic field symmetrical to the axis of the magnetic pole are arranged at least on one of upper or lower surfaces of the slave medium with the axis of the magnetic pole running in parallel to the surface of the slave medium, the magnetic field intensity distribution in track direction of the magnetic field generated is such that there is at least one point where the magnetic field intensity is higher than the coercive force Hcs of the slave medium on a position in track direction.

3. The method of claim 1, wherein said initial DC magnetization is greater than 1.2×Hcs.

4. A method for magnetic transfer by bringing a master carrier for magnetic transfer with a slave medium and by applying magnetic field for transfer, said master carrier having a magnetic layer on surface of a substrate corresponding to an information signal, and said slave medium comprising a magnetic recording medium where the information is to be transferred, said method comprising the steps of:

applying magnetic field on the surface of the slave medium in track direction, performing initial DC magnetization in advance in track direction on the slave medium, and bringing the master carrier for magnetic transfer with the slave medium processed by said initial DC magnetization closely together;

arranging permanent magnets having magnetic field symmetrical to the axis of the magnetic pole at least on one of upper or lower surfaces of the slave medium with the axis of the magnetic pole running in parallel to the surface of the slave medium;

rotating the permanent magnet or the slave medium closely combined with the master carrier for magnetic transfer in track direction; and performing magnetic transfer by applying magnetic field for transfer in track direction reverse to the direction of the initial DC magnetization, wherein, when said permanent magnets each having magnetic field symmetrical to the axis of the magnetic pole are arranged at least on one of upper or lower surfaces of the slave medium with the axis of the magnetic pole running in parallel to the surface of the slave medium, the magnetic field intensity distribution in track direction of the magnetic field generated is such that magnetic field intensity higher than the maximum value of the optimal transfer magnetic field intensity range is not present at any position in any track direction, magnetic field intensity within the optimal transfer magnetic field intensity range is present at least at one point in one track direction, and magnetic field intensity in track direction reverse thereto is lower than the minimum value of the optimal transfer magnetic field intensity range at any position in any track direction.

5. A method for magnetic transfer according to claim 4, wherein the optimal transfer magnetic field intensity is 0.6×Hcs to 1.3×Hcs with respect to the coercive force Hcs of the slave medium.

6. The method of claim 4, wherein said initial DC magnetization is greater than 1.2×Hcs.

7. An apparatus for magnetic transfer by bringing a master carrier for magnetic transfer and a slave medium closely together and by applying magnetic field for transfer, said master carrier having a magnetic layer on surface of a substrate corresponding an information signal, and said slave medium comprising a magnetic recording medium where the information is to be transferred, said apparatus comprising initial DC magnetizing means for arranging permanent magnets each having magnetic field symmetrical to the axis of the magnetic pole at least on one of upper or lower surfaces of the slave medium with the axis of the magnetic pole running in parallel to the surface of the slave medium, for rotating the slave medium or the permanent magnet in track direction, and for applying magnetic field in track direction on the surface of the slave medium to perform initial DC magnetization of the slave medium in advance in track direction, combining means for combining the master carrier for magnetic transfer with the slave medium processed by said initial DC magnetization, and transfer magnetic field applying means for applying magnetic field for transfer in track direction reverse to the direction of the initial DC magnetization on the surface of the slave medium, wherein, when said permanent magnets each having magnetic field symmetrical to the axis of the magnetic pole are arranged at least on one of upper or lower surfaces of the slave medium with the axis of the magnetic pole running in parallel to the surface of the slave medium, magnetic field intensity distribution in track direction of the magnetic field generated is such that magnetic field intensity higher than the coercive force Hcs of the slave medium is present only in one direction at a position in track direction, and magnetic field intensity in reverse direction is lower than the coercive force Hcs of the slave medium at any position in track direction.

8. An apparatus for magnetic transfer according to claim 7, wherein, when said permanent magnets each having magnetic field symmetrical to the axis of the magnetic pole are arranged at least on one of upper or lower surfaces of the slave medium with the axis of the magnetic pole running in parallel to the surface of the slave medium, magnetic field intensity distribution in track direction of the magnetic field generated is such that magnetic field intensity higher than the coercive force Hcs of the slave medium is present at least at one point on a position in track direction.

9. The apparatus of claim 7, wherein said initial DC magnetization is greater than 1.2×Hcs.

10. An apparatus for magnetic transfer by bringing a master carrier for magnetic transfer and a slave medium closely together and by applying magnetic field for transfer, said master carrier having a magnetic layer on surface of a substrate corresponding an information signal, and said slave medium comprising a magnetic recording medium where the information is to be transferred, said apparatus comprising initial DC magnetizing means for applying magnetic field in track direction on the surface of the slave medium and for performing initial DC magnetization in advance in track direction of the slave medium, combining means for combining the master carrier for magnetic transfer with the slave medium processed by said initial DC magnetization, and transfer magnetic field applying means for arranging permanent magnets each having magnetic field symmetrical to the axis of the magnetic pole at least on one of upper or lower surfaces of the slave medium with the axis of the magnetic pole running in parallel to the surface of the slave medium, for rotating said permanent magnets or the collective unit comprising said master carrier for magnetic transfer combined with said slave medium in track direction, and for applying magnetic field for transfer in track direction reverse to the direction of the initial DC magnetization, wherein, when said permanent magnets each having magnetic field symmetrical to the axis of the magnetic pole are arranged at least on one of upper or lower surfaces of the slave medium with the axis of the magnetic pole running in parallel to the surface of the slave medium, magnetic field intensity distribution in track direction of the magnetic field generated is such that magnetic field intensity higher than the maximum value of the optimal transfer magnetic field intensity range is not present at any position in any track direction, magnetic field intensity within the optimal transfer magnetic field intensity range is present at least at one point in one track direction, and magnetic field intensity in track direction reverse thereto is lower than the minimum value of the optimal transfer magnetic field intensity range at any position in any track direction.

11. An apparatus for magnetic transfer according to claim 10, wherein the optimal transfer magnetic field intensity is 0.6×Hcs to 1.3×Hcs with respect to the coercive force Hcs of the slave medium.

12. The apparatus of claim 10, wherein said initial DC magnetization is greater than 1.2×Hcs.

* * * * *